Nov. 3, 1964

B. VER NOOY 3,155,116

APPARATUS FOR CLOSING SIDE OPENINGS INTO PIPELINES

Filed June 4, 1962

Burton Ver Nooy
INVENTOR.

BY Browning, Simms
Hyer & Eincowroht

ATTORNEYS

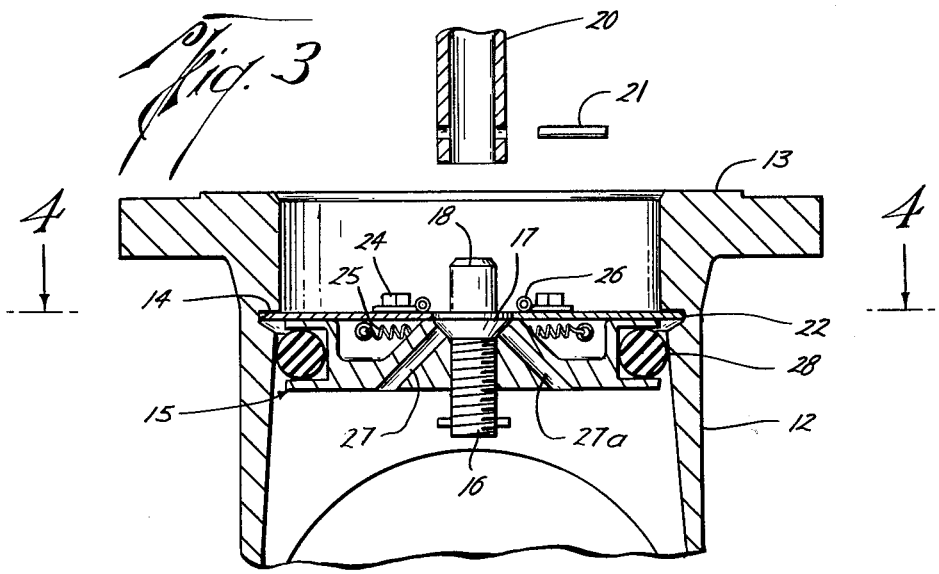
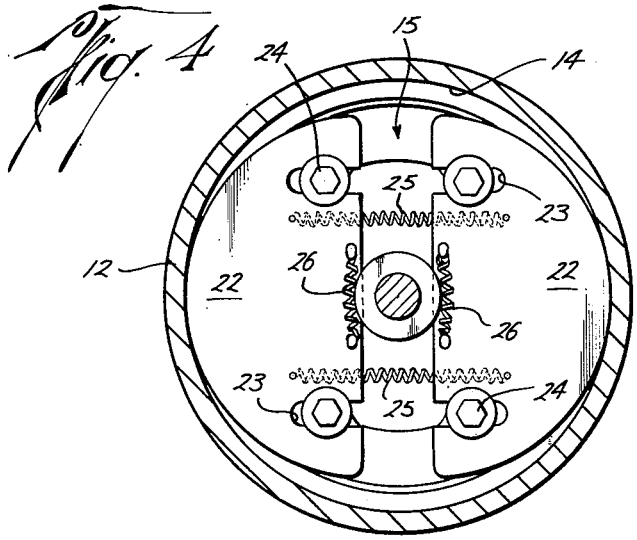

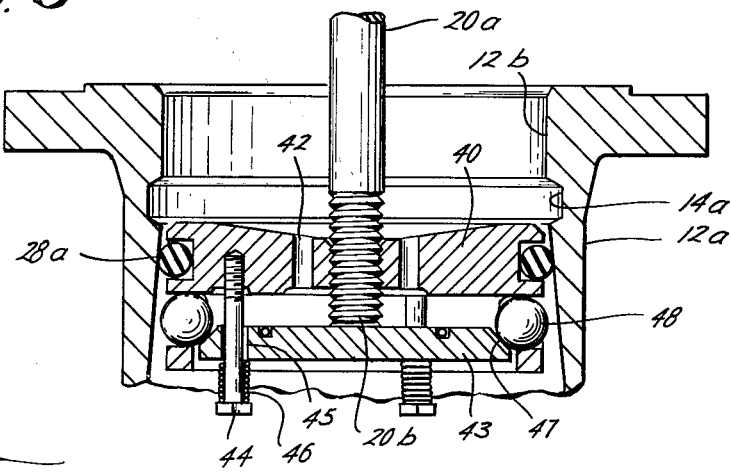
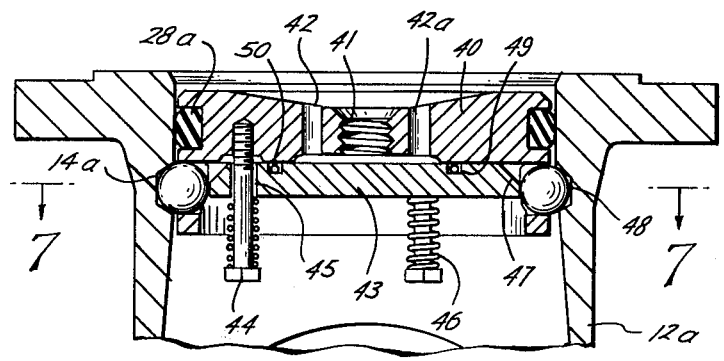
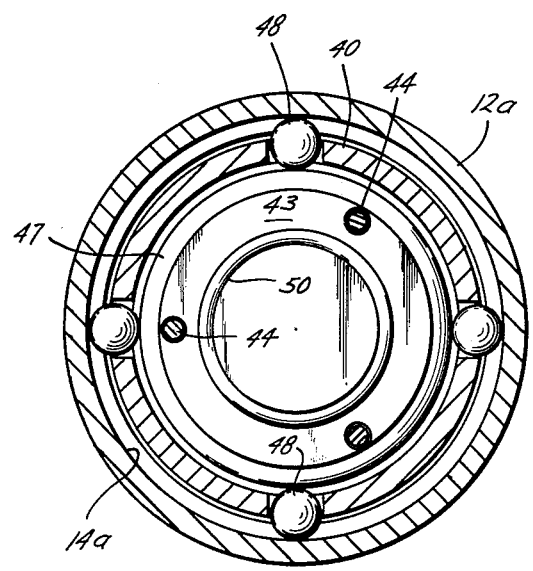

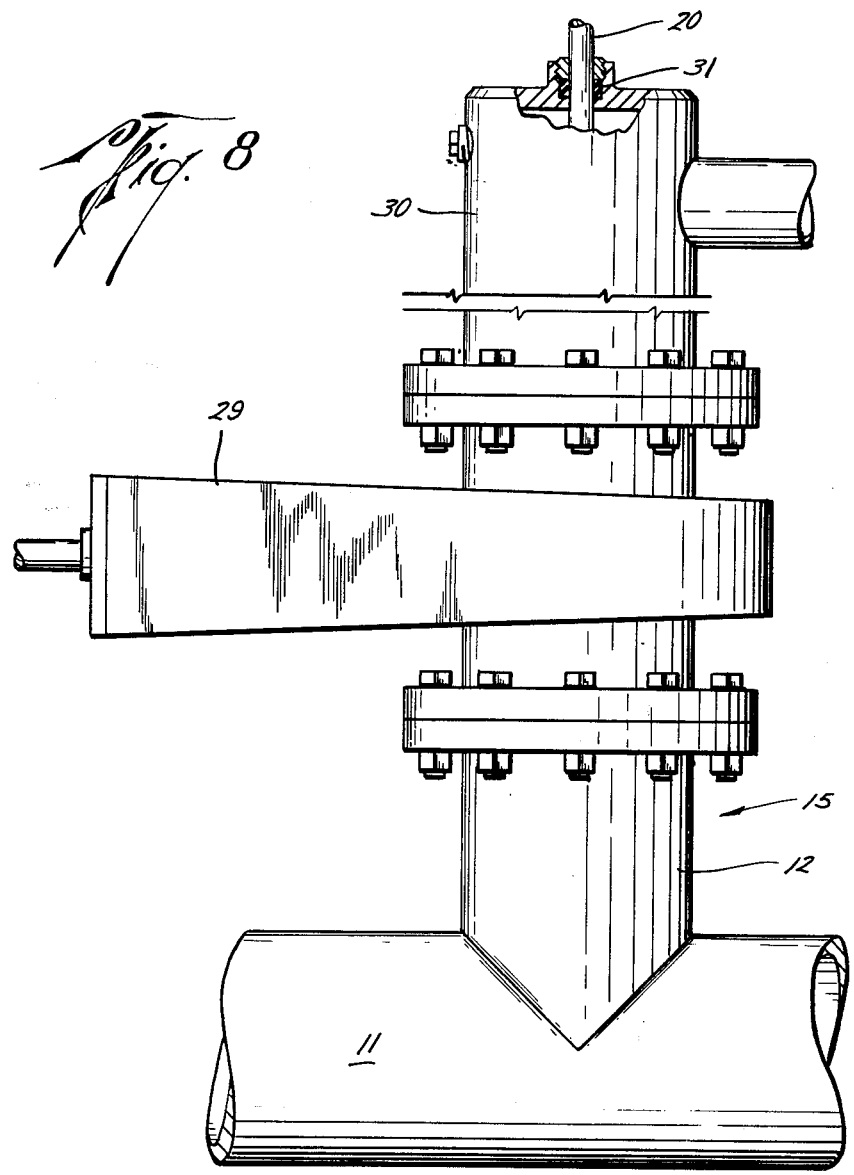

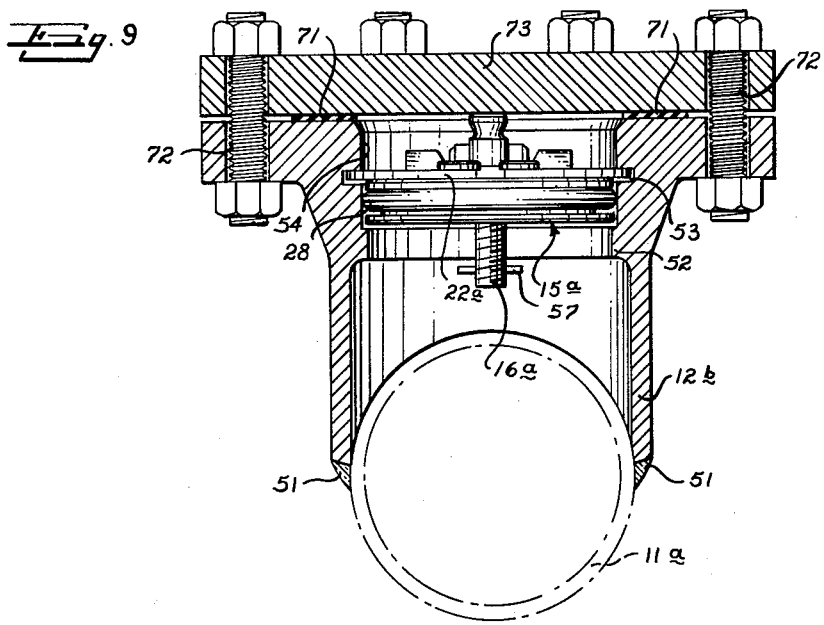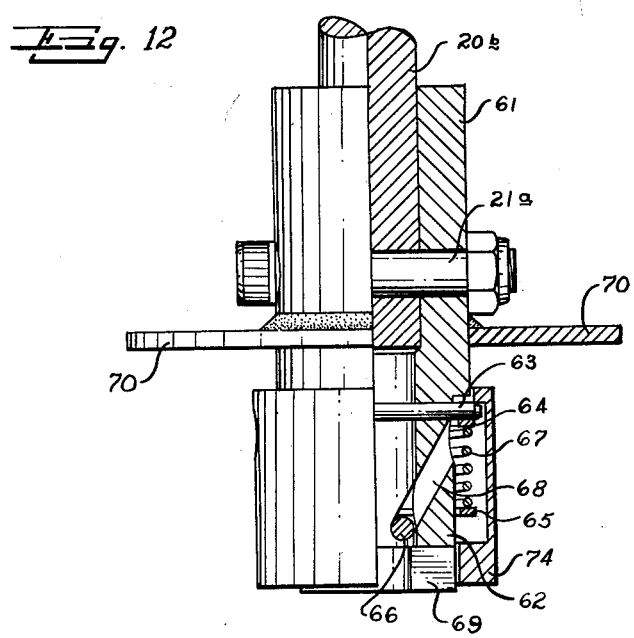

Nov. 3, 1964 B. VER NOOY 3,155,116
APPARATUS FOR CLOSING SIDE OPENINGS INTO PIPELINES
Filed June 4, 1962 6 Sheets-Sheet 6
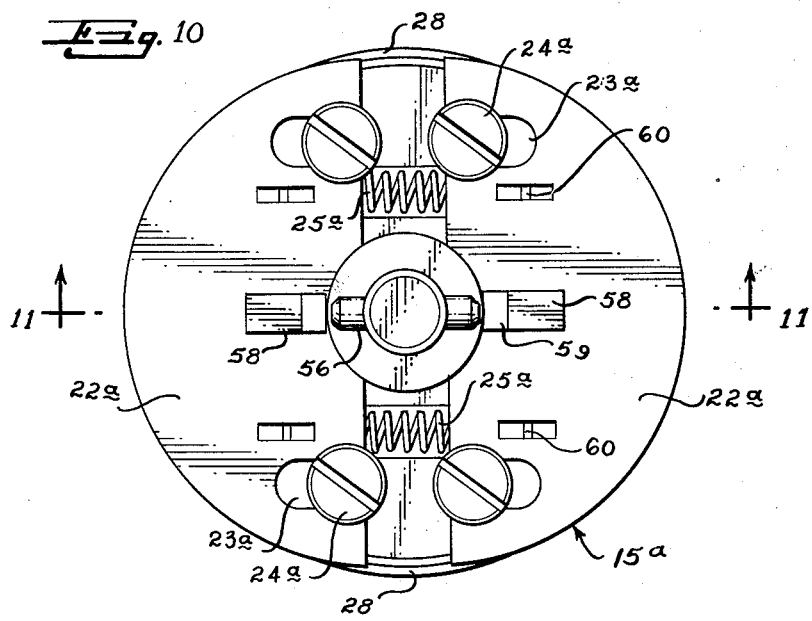
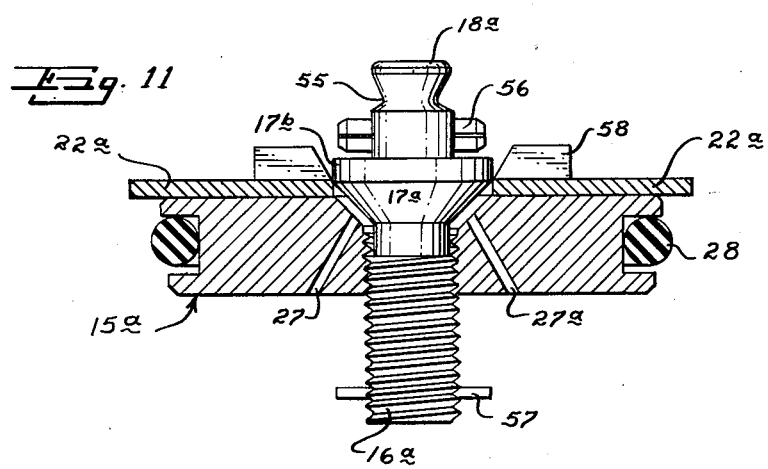
INVENTOR.
BURTON VERNOOY

United States Patent Office 3,155,116
Patented Nov. 3, 1964

3,155,116
APPARATUS FOR CLOSING SIDE OPENINGS INTO PIPELINES
Burton Ver Nooy, Tulsa, Okla., assignor to T. D. Williamson, Inc., Tulsa, Okla.
Filed June 4, 1962, Ser. No. 202,640
5 Claims. (Cl. 138—39)

This invention relates to improved apparatus for closing a side opening into a pipeline. In one aspect, it relates to improved pipe plugs for such service, and in another aspect it relates to an improved combination of nipple, plug and plug-setting means. This application is a continuation-in-part of my co-pending application Serial No. 117,366, filed June 15, 1961, now abandoned.

In the operation of pipeline systems, it is frequently desirable to make connections, install valves or make repairs in a pipeline without discontinuing the service through the line. This result usually is accomplished by "hot tapping" into the line on each side of the location where a branch line is to be connected, repairs are to be made, or other service performed, installing a bypass line to transport fluid normally carried by the line around the section to be operated on and plugging off the bypassed section.

Hot tapping on each side of the section usually is accomplshed by attaching a nipple or a split T to the outside of the pipeline at each end of the section to be taken out of service temporarily by welding the T or nipple to the exterior of the line. A tapping valve, which is normally a gate valve of sufficient size to admit a cutter of a tapping machine and plugging members, is attached to the nipple; and a tapping machine carrying a rotary cutter is attached to the valve. The tapping valve is then opened and the cutter is advanced to cut a coupon out of the pipe which is withdrawn through the valve and the valve is again closed. Tapping in this manner prevents loss of any appreciable quantity of fluid carried by the line since the tapping machine is equipped with a fluid-tight housing in which the cutter operates. Plugs are then inserted into the opposite ends of the section to be plugged off, and a bypass line is connected through the tapping valves to the side openings into the line. The valves are then opened so that service is continued while repairs are made in the plugged off section. After repairs are made, the gate valves are closed; the bypass line is removed; the nipples are plugged below the valves; and the valves are removed.

Although pipelines carrying petroleum, petroleum products and natural gas have long been serviced and repaired in this manner, it is still common for municipal pipeline networks, such as water and gas distribution systems, to be closed off with resulting interruptions in service during the time required for repair. A principal reason for not using the hot tapping-bypass line system for repair in municipal distribution systems lies in the fact that tapping machines and auxiliary equipment required to establish flow through a bypass, and for the removal of the bypass line and plugging its points of connection to the system when no longer needed, have been heavy, expensive and have required skilled operators.

It is a principal object of this invention to provide an improved apparatus for closing side openings into pipelines, such as the nipples installed for establishing service through a bypass line, which is simple in construction, cheap in manufacturing cost, light in weight, and does not require high skill for its operation.

Another object is to provide such apparatus in which a plug may be inserted through a fluid-tight chamber and a tapping valve into a nipple attached to a pipeline, thereby plugging the nipple between the tapping valve and pipeline.

Another object is to provide an improved plug having laterally movable retaining members which may be moved outward into a corresponding groove in a pipe nipple to retain the plug in place.

Another object is to provide an improved nipple and plug cooperable therewith in which means sensible to an operator indicate when the plug is in position for the laterally movable retaining members to engage said groove and to be moved outward into the groove into fully extended position.

Another object is to provide an improved plug having a passageway for fluid therethrough operable to prevent pressure differential on opposite sides of the plug while the plug is being installed and a plug-closing member operable to close said passageway through the plug.

Another object is to provide an improved apparatus for closing a nipple having a groove around a flowway therethrough in which proper location of a plug carrying laterally movable retaining members with respect to the groove is readily apparent to an unskilled workman.

Another object is to provide an improved apparatus for closing a side opening into a pipeline which is simple, light in weight and convenient to use, and which makes an effective fluid-tight seal by insuring correct position of the seal in the nipple to be closed.

Other objects, advantages and features of this invention will be apparent to one skilled in the art upon consideration of the written specification, the claims and the attached drawings.

In the present invention a special type nipple is provided to fit upon the exterior of the pipeline and to be attached to the line in leakproof relationship therewith, preferably by welding. The end of the nipple opposite the pipeline is equipped with suitable means, such as threads or a flange tapped to receive bolts, for attaching to a tapping valve which in turn may be attached to a fluid-tight chamber or to a bypass line. The nipple has a groove around its interior in a plane substantially normal to the longitudinal axis of a flowway through the nipple.

A plug is provided having a central threaded opening therein to receive a suitably threaded control screw which may be manipulated by a landing rod inserted through a circular seal in a fluid-tight housing and an open tapping valve. The control screw may be merely a threaded end section of the landing rod, or may be a threaded section of a separate central plug-closing member forming a part of the plug, and detachably attached to the end of the landing rod, preferably by a snap-on connection, although the connection may be made in any manner desired, such as a socket in the end of the landing rod or plug-closing member, and a pin passed through the central plug member and rod.

Attachment of the plug to the end of the landing rod enables manipulation of the plug by the landing rod. Thus, the plug may be moved toward and away from the pipeline by sliding the landing rod in and out through the seal in the chamber, and rotation of the landing rod will cause longitudinal travel of the control screw in the central threaded opening in the plug.

One or more passageways for fluid extending from the inner face to the outer face of the plug and spaced from the central threaded opening are provided so that fluid pressure on the inner and outer faces of the plug may be equalized as the plug is inserted into the nipple for the required distance.

The plug is equipped with retaining members, which are preferably a pair of plates or a series of balls or other detent members laterally movable outward to engage the groove in the nipple, thus retaining the plug in a selected location provided by the groove.

Means are provided for concomitantly moving the retaining members carried by the plug laterally outward and closing the passageways for fluid through the plug in response to longitudinal movement of the control screw in the central threaded opening. Lateral movement of the retaining members carried by the plug is effected by cam means cooperable with the control screw so that longitudinal movement of the control screw in the central threaded opening by rotation of the landing rod will apply pressure to the retaining members tending to move them outward.

This arrangement permits the control screw to be positioned in the central opening at a point which permits the retaining members to be in withdrawn position while the plug is inserted into the nipple. A means, sensible to an operator, is provided for determining when the plug is in the nipple in position for the retaining members to be moved outward to the full extent of their travel into the groove. This means may be a shoulder on the inside of the nipple around the flowway therethrough in position to contact the bottom of the plug and arrest its travel when the plug is in proper position, or may be resilient members carried by the plug and actuated by the control screw to apply a slight outward pressure upon the retaining members so that the plug may be inserted into a nipple having no shoulder to a depth known to be greater than that where the groove is to be encountered by the retaining members, and then moved outward along the axis of the flowway so that the retaining members encounter the groove and motion of the plug is arrested thereby when the groove is encountered. Under these conditions, with slight pressure upon the retaining members, they immediately snap outward into the groove for a distance sufficiently great to hold the plug firmly at the proper location so that the retaining members may be moved further outward by rotation of the landing rod which imparts longitudinal travel to the control screw in the plug.

When the snap-action arrangement is used, the control screw is rotated to a position relieving pressure upon the laterally movable retaining members tending to move them outward while the plug is inserted into the nipple to a depth known to be greater than that where the groove is to be encountered by the retaining members. The landing rod is then rotated to move the control screw longitudinally along the axis of the plug so that outward pressure is applied to the retaining members. The plug is then withdrawn slowly under these conditions until the retaining members encounter the groove in the nipple when they immediately snap outward into the groove and hold the plug in place. This snap action of the plug enables an unskilled operator to know exactly when he has the plug in proper position. Contact with the shoulder when a shoulder on the nipple is used as locating means has the same effect. The retaining members are then moved outward into the retaining groove to the full extent of their travel; the landing rod is disconnected from the plug; and the tapping valve may then be removed, leaving only a short plugged nipple at the site where the line was tapped. This nipple preferably is covered with a simple cap which may be a flat plate connected to the nipple by screws or bolts.

An annular sealing member is disposed around the periphery of the plug in position to seal against the interior of the nipple when the retaining members are in the groove. It will thus be seen that the present apparatus positions the plug correctly in sealed position in the nipple and lack of skill of an operator cannot improperly position the plug.

In the attached drawings, wherein like reference characters are used throughout to designate like parts:

FIG. 3 is a vertical section through the same device showing the plug in its final position in the groove with the restricted openings through the plug closed by the plug-closing means with the retaining members moved outward in the groove to their limit of travel;

FIG. 4 is a horizontal section of the device in FIG. 3 on the line 4—4;

FIG. 5 is a vertical section through another embodiment of the invention utilizing a plug of modified type;

FIG. 6 is a vertical section through the device of FIG. 5 showing the retaining members engaged in the groove in the nipple;

FIG. 7 is a horizontal section through the device of FIG. 6 on the line 7—7;

FIG. 8 is a general view of the device, partly in section, showing its relationship to a pipeline, tapping valve, fluid-tight chamber and bypass line;

FIG. 9 is a vertical section through another preferred embodiment of this invention showing a plug in closed position in a nipple after the tapping valve has been removed and the nipple is covered by a plate;

FIG. 10 is a plan of the plug of FIG. 9;

FIG. 11 is a vertical section through the plug of FIG. 10 on the line 11—11; and FIG. 12 is an elevation, partly in section, of a preferred snap-on connection for connecting the plug of FIGS. 10 and 11 to a landing rod.

Figure 1:
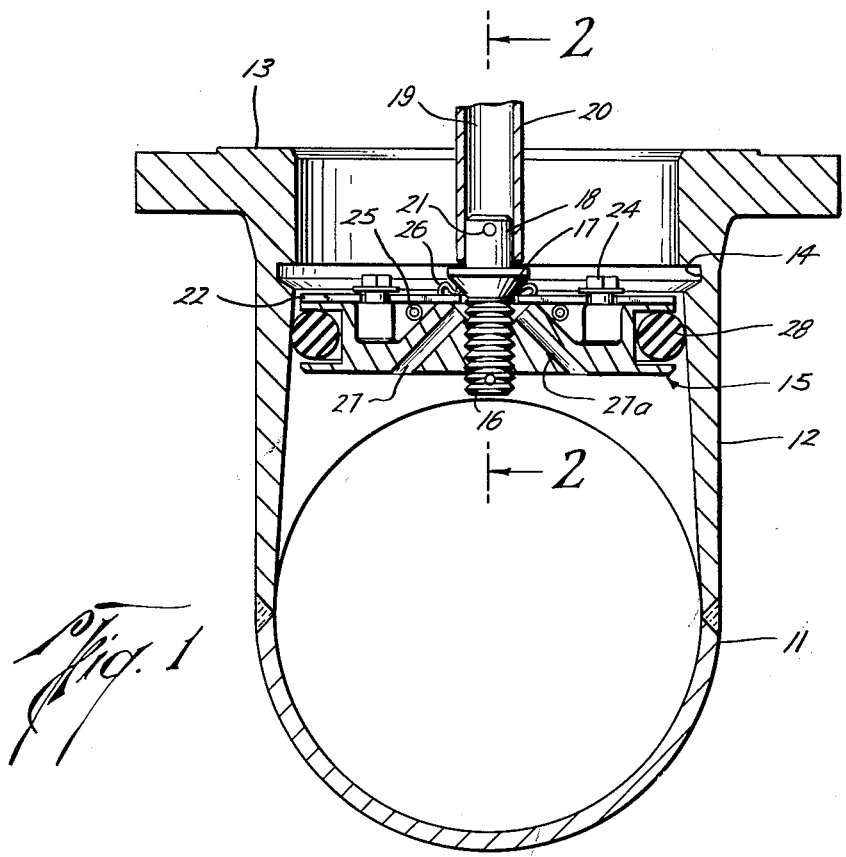
FIG. 1 is a vertical section through a pipe-line having a nipple attached thereto with a plug constructed according to one embodiment of the present invention inserted beyond a point where the retaining members can engage the groove.
Figure 2:
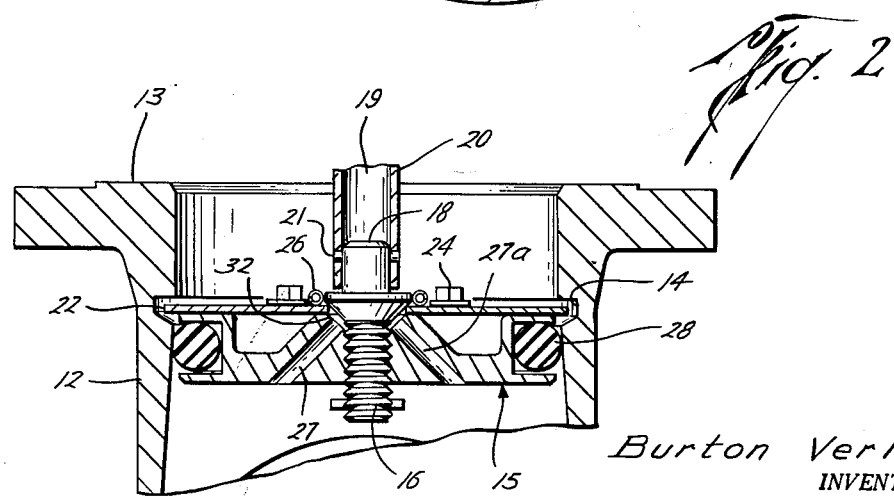
FIG. 2 illustrates the same device rotated 90° to the line 2—2 of FIG. 1 in a position in which the retaining members are engaged in the groove to retain the plug in place.

In FIG. 1, the reference numeral 11 indicates a pipe-line having a nipple 12 attached to its exterior surface. Nipple 12 at its outer end 13 is adapted to be attached to a tapping valve or similar equipment and may be flanged for attachment by clamps or bolts as shown or may be externally threaded if a tapping valve having an internally threaded housing is used. Nipple 12 also has a groove 14 adapted to receive retaining members, carried by a plug designated generally as 15, formed on its interior in a plane substantially normal to the axis of the nipple.

Plug 15 has a central threaded opening therethrough receiving a control screw 16. The control screw is illustrated as an integral part of a plug-closure member having a tapered shoulder 17 and a shank 18. Shank 18 is received in a socket 19 of a landing rod 20 and is releasably attached to rod 20 as an extension thereof by means of a pin 21 extending through openings in the rod and shank. Plug 15 carries a pair of laterally movable plates 22 shown in plan in FIG. 4 and functioning as retaining members for retaining the plug in a selected position in the nipple by engaging groove 14.

Plates 22 have elongate slots 23 receiving studs 24 screwed into the body of the plug. Plates 22 are freely slidable upon the plug and are retained in retracted position when the control screw is in the position illustrated in FIG. 1 by tension of springs 25. A pair of springs 26 are arranged parallel to each other adjacent the inner edge of the plates in position to be engaged by the tapered shoulder 17 of the holding means when the control screw is moved further into the plug. Springs 26 are stronger than springs 25 so that pressure applied upon springs 26 tending to force them outward overcomes the tension of springs 25 with the result that plates 22 are forced outward resiliently by advance of the holding means into the threaded opening in the plug.

Plug 15 has a pair of restricted openings 27 and 27a therethrough in order to equalize pressure on opposite sides of the plug while the plug is being inserted into the nipple and has an annular seal 28 around the body of the plug in position to seal against the interior wall of the nipple when the retaining plates 22 are engaged in groove 14.

The reason for openings 27 and 27a is apparent from the arrangement of apparatus illustrated in FIG. 8. The plug will normally be landed from a fluid-tight chamber 30 by means of landing rod 20 with a tapping valve 29 in open position. Chamber 30 preferably is equipped with a circular seal 31 in a wall of the chamber opposite the pipeline in position to make sealing contact with landing rod 20 so that, with pressure equalized on both sides of plug 15, landing rod 20 may slide through seal 31 without having to overcome a pressure differential across the plug. The tapered shoulder 17 on the plug-closure member serves not only to apply or release pressure upon springs 26 but also cooperates with a sloping surface 32 on the plug to close restricted passageways 27 and 27a when the plug is in place. For this reason, the taper of shoulder 17 preferably is very slightly greater than the slope of surface 32 so that metal-to-metal contact occurs between the plug and closure member at a point above the upper end of passageways 27 and 27a.

The manner of operation is believed to be obvious from the above description. When the bypass line has served its purpose and the nipple is to be plugged, the chamber 30 is disconnected from the tapping valve 29 and the shank of the plug-closure member is attached to the landing rod 20 extending through the fluid-tight chamber. The control screw is moved into the plug to the position shown in FIG. 1 in which there is substantially no outward pressure exerted on springs 26 by the tapered shoulder 17. The fluid-tight chamber is then attached to the tapping valve, and the tapping valve is opened to permit passage of plug 15 into nipple 12.

Pressure is exerted on landing rod 20 to move the plug downward into nipple 12, and pressure of fluid in the pipeline flowing through passageways 27 and 27a fills chamber 30 to equalize pressure on opposite sides of plug 15.

The plug is moved downward to a position known to be below that of groove 14 in the nipple, and the landing rod is rotated to move the control screw further into the plug so that tapered shoulder 17 exerts outward pressure on springs 26 sufficient to overcome the tension of springs 25, and the plates 22 are biased laterally outward from the center of the plug.

With the holding means in this position, the plug is then moved upward by the landing rod until plates 22 encounter groove 14. At this point the plates snap outward into the position shown in FIG. 3, locking the plug in the nipple and bringing the seal 28 into sealing contact with the inner surface of the nipple.

The control screw is then screwed downward to the position shown in FIG. 3 where it exerts maximum outward pressure on springs 26 and shoulder 17 makes a metal-to-metal contact with the sloping surface 32 of the plug body, thus closing off passageways 27 and 27a. The side opening into the pipeline is thus effectively closed by plugging nipple 12. The chamber 30 is then disconnected from the tapping valve; pin 21 is removed from the landing rod so that the landing rod may be withdrawn; and the tapping valve is disconnected, thus leaving only the plugged nipple at the point where the pipeline was opened.

In the embodiment shown in FIGS. 5, 6 and 7, the nipple 12a is substantially the same as that shown in FIG. 1 except that it has a wider groove 14a around its interior to receive retaining members of different type. The plug in this embodiment comprises a body 40 having a central threaded opening 41 and restricted passageways 42 and 42a therethrough. A control screw, which is in this case merely a threaded end 20b of landing rod 20a, has threads on an end portion of the rod of sufficient length that it may penetrate through the plug body 40 for a considerable distance. An annular seal 28a is carried by the plug body in position to seal against an interior surface 12b of nipple 12a when the plug is in sealing position.

A plate 43 is carried by a series of studs 44 attached to body 40 and is freely movable on the studs because of loose fitting openings 45 in plate 43. A resilient member, preferably a coil spring 46, is carried by each of the studs in position to force the plate 43 toward the plug body. Plate 43 has a beveled outward surface 47 which bears upon a series of retaining members illustrated as balls 48 tending to force the retaining members outward. Any number of retaining members 48 may be used as desired, but four are illustrated in FIG. 7 as this number has been found to be desirable for a six-inch plug subjected to about 150 p.s.i.

Plate 43 has a groove 49 in position to completely surround openings 41, 42 and 42a. An annular sealing member 50 is disposed in groove 49 to seal against the lower face of plug 40 when plate 43 is moved upward into contact with the plug.

It is believed that the operation of this device is obvious from the above description. To insert the plug, chamber 30 is opened while tapping valve 29 is closed, and the landing rod 20a is screwed into the plug to the position shown in FIG. 5.

In this position, the end of the control screw bears upon plate 43 and applies pressure thereto, compressing springs 46 and forcing plate 43 away from the plug body 40. In this position a cam provided by the beveled edge 47 of the plate is lowered permitting the retaining members 48 to move inward.

The chamber 30 is then attached to the tapping valve 29, the valve is opened and the plug is pushed into the position in the nipple shown in FIG. 1 by exerting pressure on landing rod 20a outside the housing. The plug is thus advanced to a position beyond that which it will occupy in sealing position, and the landing rod 20a is rotated to withdraw it partially from the threaded opening 41 in plug body 40. As landing rod 20a moves upward as a result of the rotation applied, plate 43 moves nearer body 40, thus exerting outward pressure on retaining members 48, forcing them outward. The landing rod 20a is then drawn upward slowly; and when the retaining members 48 encounter the groove 14a, they are snapped outward by pressure of springs 46, thus locking the plug in place with sealing members 28a effectively sealing against the surface 12b on the bore of the nipple. The landing rod 20a is then completely detached by unscrewing it from the opening 41 and may be withdrawn. In this position an unbeveled section of the edge of plate 43 is in contact with retaining members 48 and holds them firmly in position while the annular seal 50 is forced against the surface of plug body 40 by pressure of springs 46, thus sealing off openings 42, 41 and 42a.

With the plug in this position, the tapping valve, chamber and bypass line may be removed, leaving only the short nipple 12a at the point where the line was tapped. If desired, a cap or other suitable cover may be placed over the end of nipple 12a to prevent water or corrosive materials from coming in contact with the plug when the plugged opening is to be left without further attention.

In the preferred modification shown in FIGS. 9 to 11, inclusive, a nipple 12b is attached around a side opening into pipeline 11a in leakproof relationship therewith illustrated as by welding at 51. Nipple 12b has a shoulder 52 around its interior in position to contact the inner side of plug 15a when the plug is in position for retaining members 22a, illustrated as plates, to move outward into groove 53. The control screw 16a is formed as an integral part of the central plug-closing member 18a which has a shank adapted to engage a snap-on holder shown only in FIG. 12 carried by a landing rod.

The flowway above the shoulder 52 in the nipple is cylindrical in shape to provide a good seating surface for a seal 28 extending around the periphery of plug 15a in position to seal against the interior of the nipple.

Details and construction of the plug are best seen in FIGS. 10 and 11. The body of plug 15a has a central tapered depression in its outer surface communicating with a central threaded opening through the plug adapted to receive a control screw 16a. In this embodiment the control screw is made integral with a valve-closing member which includes the control screw, a tapered shoulder 17a adapted to make sealing contact with the tapered depression in the outer side of the plug on advance of the control screw farther into the plug, thus sealing off passageways for fluid 27 and 27a extending from the inner surface to points in the tapered depression where they will be closed off by advance of the tapered shoulder 17a.

The plug-closing member also includes a cylindrical shoulder 17b just above the tapered shoulder 17a and a shank portion 18a having an annular groove 55 around it in position to receive the snap-on connection illustrated in FIG. 12. The plug-closing member also carries a cross pin 56 adapted to engage a slot 69 in the snap-on connection so that rotation of the landing rod will revolve the screw.

The retaining members shown are plates 22a which are semi-annular in shape and are slidable laterally upon the upper surface of plug 15a. Suitable springs 25a are attached to each of the plates by spring-attaching members 60 and are located in grooves in the upper side of the plug shown in FIG. 10. The plates 22a have guide slots 23a engaging guide members 24a so that the inner edges of the plates remain parallel to each other as the plates are moved laterally inward and outward.

Pressure members 58 are attached to the outer side of plates 22a tangent to the inner edges of the plates. Members 58 have beveled faces 59 facing the plug-closure member in position to be contacted by the tapered shoulder 17a as the control screw 16a advances through the central threaded opening to bring the plug-closure member into closing position. The beveled surface 59 and the sloping shoulder 17a perform the functions of a cam follower and a cam, respectively, so that advance of the control screw applies pressure to plates 22a to move them outward to their fully extended position in groove 53.

When it is desired to release the plates from the groove, it is merely necessary to rotate the control screw in the opposite direction so that the shoulder 17a is brought above the beveled faces 59, thus releasing the plates to be drawn inward by tension of springs 25a.

The control screw 16a is provided with a pin 57 to prevent the plug-closure member from being accidentally withdrawn from the plug by too great rotation in plug-opening direction and is cooperative with the snap-on attachment shown in FIG. 12. This snap-on attachment preferably is attached to an inner end of a landing rod 20b which extends outward through circular seal 31 in a wall of a fluid-tight housing opposite the pipeline as best shown in FIG. 8. Attachment of the snap-on connection is made by bolt 21a passing through a wall 61 of the snap-on attachment and landing rod 20b.

The inner end of the snap-on connection has an inner wall 62 surrounding a central cylindrical opening in the attachment adapted to receive the shank 18a. The wall 62 has a pair of opposed slots 68, only one of which is shown in FIG. 12. Pins 66 are located in these slots and are slidable therein from the gripping position illustrated to a shank-releasing position further up in slot 68. A resilient member, illustrated as spring 67, is disposed between annular washers 64 and 65. These washers extend around the exterior of wall 62 so that the lower washer 65 bears upon the upper surface of rods 66 and the upper surface of washer 64 is limited in movement by a pin 63 passed through the walls of the retaining member. The spring and annular washers are surrounded by an annular housing 74. Transverse slots 69 are provided in wall 62 to receive the cross pin 56 of the plug-closing member, and a transverse plate 70 is provided to prevent the movable housing 74 from being pushed too far up the exterior of the snap-on connection.

It is believed that the operation of this apparatus is obvious from the above description. When it is desired to remove the bypass line after repairs on the plugged off section have been made, the tapping valve 29 shown in FIG. 8 is closed; the plug 15a is inserted into the fluid-tight chamber 30 and is snapped onto the inner end of landing rod 20a. The fluid-tight chamber is then re-attached to the tapping valve 29; the valve is opened; and the plug is inserted into the nipple 12b by sliding the landing rod through the circular seal 31, until longitudinal travel of the plug in nipple 12b is halted by contact with shoulder 52. The landing rod is then rotated to cause the control screw to advance longitudinally through the threaded central opening in the plug. As the screw advances, the tapered shoulder 17a comes in contact with the beveled surfaces 59 of pressure members 58 carried by the laterally movable plates 22a and forces the plates outward into fully extended position in groove 53. When the plates are moved outward to their full extent, the control screw is rotated still further, thus bringing the cylindrical shoulder 17b into contact with the inner edge of plates 22a locking the plates in position and providing for a tight metal-to-metal seal between the sloping shoulder 17a and the tapered depression in the outer face of the plug. Fluid passageways 27 and 27a are thus closed off so that little, if any, leakage occurs.

The tapping valve is then disconnected from the nipple and an annular seal illustrated as gasket 71 is placed upon the upper surface of the nipple and a permanent closure plate 73 is attached to the nipple by studs 72, thus providing a short and inexpensive permanent closure for the nipple.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for closing a side opening into a pipeline comprising in combination a nipple attached to the exterior of the pipeline around an opening into the side of the pipe, said nipple having a groove around its interior substantially normal to a flowway through the nipple; a plug, fitting into the flowway, having a central threaded opening therethrough, an annular fluid energized seal of the O-ring type carried by and around the plug in position to seal between the sides of the plug and the interior of the nipple as the plug is moved through the flowway in the nipple as well as when the plug is in its final plugging position in the flowway; said plug also having a flow passageway therethrough spaced from the threaded opening and inwardly from the periphery of the plug for bypassing fluid across the plug so as to equalize pressures thereacross; a control screw engaging the threaded opening through the plug; and valve and cam means operable, responsive to longitudinal travel of the control screw in one direction, to move said retaining members outwardly into said groove and to close said passageway through the plug, and also operable, responsive to longitudinal travel of the control screw in the opposite direction, to open said passageway to equalize pressure across said plug and to permit said retaining members to be retracted from said groove so the plug can be moved out of said nipple.

2. The apparatus of claim 1 wherein a means is provided for arresting longitudinal travel of the plug in the flowway including a shoulder around the interior of the nipple abuttable by the plug.

3. The apparatus of claim 1 in combination with resilient members connected to the retaining members and operable, responsive to initial longitudinal travel of the control screw in said one direction, to bias said retaining members outwardly so the resilient members can snap the retaining members into said groove when the retaining members are moved opposite said groove.

4. The apparatus of claim 1 wherein the plug has a central tapered depression in its upper side surrounding said threaded opening, the valve and cam means includes a cam surface which is a tapered shoulder on the control screw and movable therewith and fitting into said tapered depression and wherein the passageway for fluid through the plug extends from the inner side of the plug to the tapered depression at a point spaced from the upper side of the plug.

5. The apparatus of claim 1 wherein the laterally movable retaining members are plates.

References Cited in the file of this patent

UNITED STATES PATENTS

| | | |
|---|---|---|
| 1,300,899 | Wagner | Apr. 15, 1919 |
| 1,560,489 | Yager | Nov. 3, 1925 |
| 1,830,949 | Lake | Nov. 10, 1931 |
| 1,895,827 | Van Hecke | Jan. 31, 1933 |
| 2,010,200 | Rufener et al. | Aug. 6, 1935 |
| 2,854,274 | Gordon | Sept. 30, 1958 |
| 2,913,263 | Zajac | Nov. 17, 1959 |
| 3,051,200 | Bevington | Aug. 28, 1962 |

FOREIGN PATENTS

| | | |
|---|---|---|
| 13,644 | Great Britain | of 1905 |
| 855,275 | Great Britain | Nov. 30, 1960 |
| 300,124 | Switzerland | Sept. 16, 1954 |